United States Patent [19]

Vlaanderen et al.

[11] Patent Number: 4,911,330

[45] Date of Patent: Mar. 27, 1990

[54] SERVICE VEHICLE WITH DISPENSING SYSTEM

[75] Inventors: James Vlaanderen; Francis L. Zrostlik; Ivan D. Dodd, all of Garner, Iowa

[73] Assignee: Iowa Mold Tooling Company, Inc., Garner, Iowa

[21] Appl. No.: 262,038

[22] Filed: Oct. 24, 1988

Related U.S. Application Data

[63] Continuation of Ser. No. 88,229, Aug. 24, 1987, abandoned.

[51] Int. Cl.[4] ............................................. F04B 17/26
[52] U.S. Cl. .................................. 222/132; 222/144.5; 222/626; 222/627; 280/838
[58] Field of Search ............ 222/626, 627, 132, 144.5; 180/53.4, 53.8, 306, 307; 280/5 C, 5 D, 5 E; 184/1.5; 417/390, 222, 46, 216

[56] References Cited

U.S. PATENT DOCUMENTS

| Re. 29,333 | 8/1977 | Pensa | 417/216 |
|---|---|---|---|
| 2,037,020 | 4/1936 | Holby | 280/5 D X |
| 2,193,893 | 3/1940 | Van Vleck | 280/5 C X |
| 2,498,229 | 2/1950 | Adler | 280/5 C X |
| 2,765,938 | 10/1956 | DiAddezio | 184/1.5 X |
| 3,043,224 | 7/1962 | Brown | 417/216 X |
| 3,147,886 | 9/1964 | Sacco | 222/144.5 X |
| 3,440,965 | 4/1969 | Raymond | 417/216 |
| 3,612,356 | 10/1971 | McVey | 222/627 X |
| 3,810,487 | 5/1974 | Cable et al. | 184/1.5 X |
| 4,008,004 | 2/1977 | Shaw | 417/216 |
| 4,131,214 | 12/1978 | Rogers | 280/5 D X |
| 4,177,017 | 12/1979 | Schultz | 417/390 X |
| 4,715,788 | 12/1987 | Kouns et al. | 417/222 X |

OTHER PUBLICATIONS

McLellan Industries Sales Brochure, 251 Shaw Rd., So., San Francisco, CA 94080.

*Primary Examiner*—Joseph J. Rolla
*Assistant Examiner*—Gregory L. Huson
*Attorney, Agent, or Firm*—Wood, Dalton, Phillips, Mason & Rowe

[57] ABSTRACT

A service vehicle includes a frame (10) on which a material dispensing system is mounted. The dispensing system includes reservoirs (30, 32) and (34) for various lubricants or the like and pumps (46) for pumping material out of the associated reservoirs (30, 32) and (34). The pumps (46) are driven by hydraulic motors (50) which may receive hydraulic fluid under pressure through electrically operated control valves (76) from a pressure compensated, variable displacement pump (60) driven by the engine (64) for the vehicle. The use of the pressure compensated variable displacement pump (60) achieves operating efficiencies.

9 Claims, 1 Drawing Sheet

SERVICE VEHICLE WITH DISPENSING SYSTEM

This application is a continuation of application Ser. No. 088,229, filed Aug. 24, 1987, and now abandoned.

FIELD OF THE INVENTION

This invention relates to a service vehicle as may be utilized for servicing other equipment such as off the road vehicles, remotely located machinery, etc., and more particularly to a dispensing system for servicing materials transported on the service vehicle.

BACKGROUND OF THE INVENTION

Recent years have been a considerable increase in the use of service vehicles in the servicing of remotely located equipment, off the road vehicles and the like. The service vehicles are adapted to transport servicing materials and/or equipment whereby routine operations and maintenance may be performed on site on the equipment or other vehicle to be serviced.

The service vehicles employed may be extremely simple to quite complex, ranging from a farmer's pick-up truck provided with a fuel reservoir for refueling tractors and/or combines in the field to special operations servicing vehicles which are capable of providing numerous servicing operations on remotely located machinery. For example, service vehicles have been utilized to provide a means of servicing remotely located equipment in terms of providing lubrication therefor. Typically, such vehicles are provided with a power take off to a fixed displacement hydraulic pump which in turn drives an air compressor. The air compressor is then used to provide pneumatic energy which is utilized in transporting the lubricants from storage locations on the truck to a point of use through suitable conduits.

Though such vehicles are capable of performing their intended function, they leave a lot to be desired. The utilization of a fixed displacement hydraulic pump to drive the air compressor requires unnecessary use of engine horsepower to maintain the compressor operable. Typically air pumps powered by the compressed air from the compressor for transporting lubricants are not particularly efficient and the ever present problem of condensate in compressed air lines could unexpectedly and undesirably render the service vehicle inoperative to perform the servicing function due to freezing of condensate in such air lines.

The present invention is directed to overcoming one or more of the above problems.

SUMMARY OF THE INVENTION

It is the principal object of the invention to provide a new and improved service vehicle. More specifically, it is an object of the invention to provide a service vehicle with a material dispensing system for dispensing, as for example, lubricants and the like, that is highly efficient, does not require unnecessarily high energy input, and whose operability is not subject to the whims of the surrounding environment.

An exemplary embodiment of the invention achieves the foregoing object in a service truck including a vehicle provided with the frame and an engine. A pressure compensated, variable displacement, hydraulic pump is mounted on the vehicle frame and is selectively drivable by the engine. At least one tank is located on the frame and contains a fluid to be utilized in the servicing of equipment. A fluid pump is associated with each such tank where there are more than one for pumping the flud from the tank. A dispensing valve is associated with each such fluid pump and is operable to allow or prevent the pumping of fluid from the corresponding tank. A hydraulic motor is also provided for each fluid pump and is connected thereto to drive the same and is controlled by an electrically operated control valve which is selectively operable to connect or disconnect the associated motor to the variable displacement hydraulic pump.

As a result of this construction, service truck functions may be selected by the use of an electric switch and when the dispensing valve is turned off, line pressure will build up to destroke the hydraulic pump to thereby essentially turn the pumps off and minimize energy requirments. Conversely, when the dispensing valve is opened, product line pressure will drop, thus reducing the hydraulic pressure at the hydraulic pump allowing the pump to be stroked to increase flow to the desired flow control setting.

An exemplary embodiment of the invention provides pressure compensated flow control means in hydraulic series with each of the control valves and the associated motor.

The invention further contemplates the provision of an air compressor mounted on the frame, there being an additional one of the hydraulic motors for driving the air compressor and an additional one of the control valves for the additional motor.

In a highly preferred embodiment, there are a plurality of such reservoirs or tanks on the vehicle frame, one for each of a plurality of different fluids that may be utilized in the servicing of equipment.

In a highly preferred embodiment, in addition to the plurality of reservoirs or tanks on the vehicle, there are provided a plurality of pumps, one for each of the tanks or reservoirs, a plurality of the hydraulic motors, one for each such fluid pump, and a plurality of the control valves, one for each such hydraulic motor.

The invention also contemplates a further reservoir on the frame together with a bidirectional pump associated with the additional reservoir for pumping a fluid into or out of the reservoir. A bidirectional hydraulic motor is connected to the bidirectional pump to bidirectionally drive the same and is adapted to receive hydraulic fluid from the hydraulic pump. An electrically operated control valve means is disposed between the hydraulic pump and the bidirectional motor for controlling energization and a direction of operation thereof to thereby cause fluid to be pumped to or from the additional reservoir.

Other objects and advantages will become apparent from the following specification taken in connection with the accompanying drawings.

DESCRIPTION OF THE PREFERRED EMBODIMENT

Figure 1:
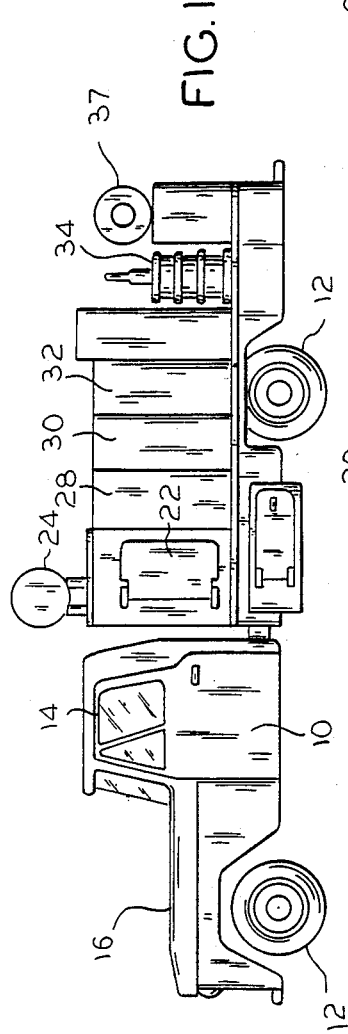
FIG. 1 is a side elevation of a service vehicle embodying the invention.
Figure 2:
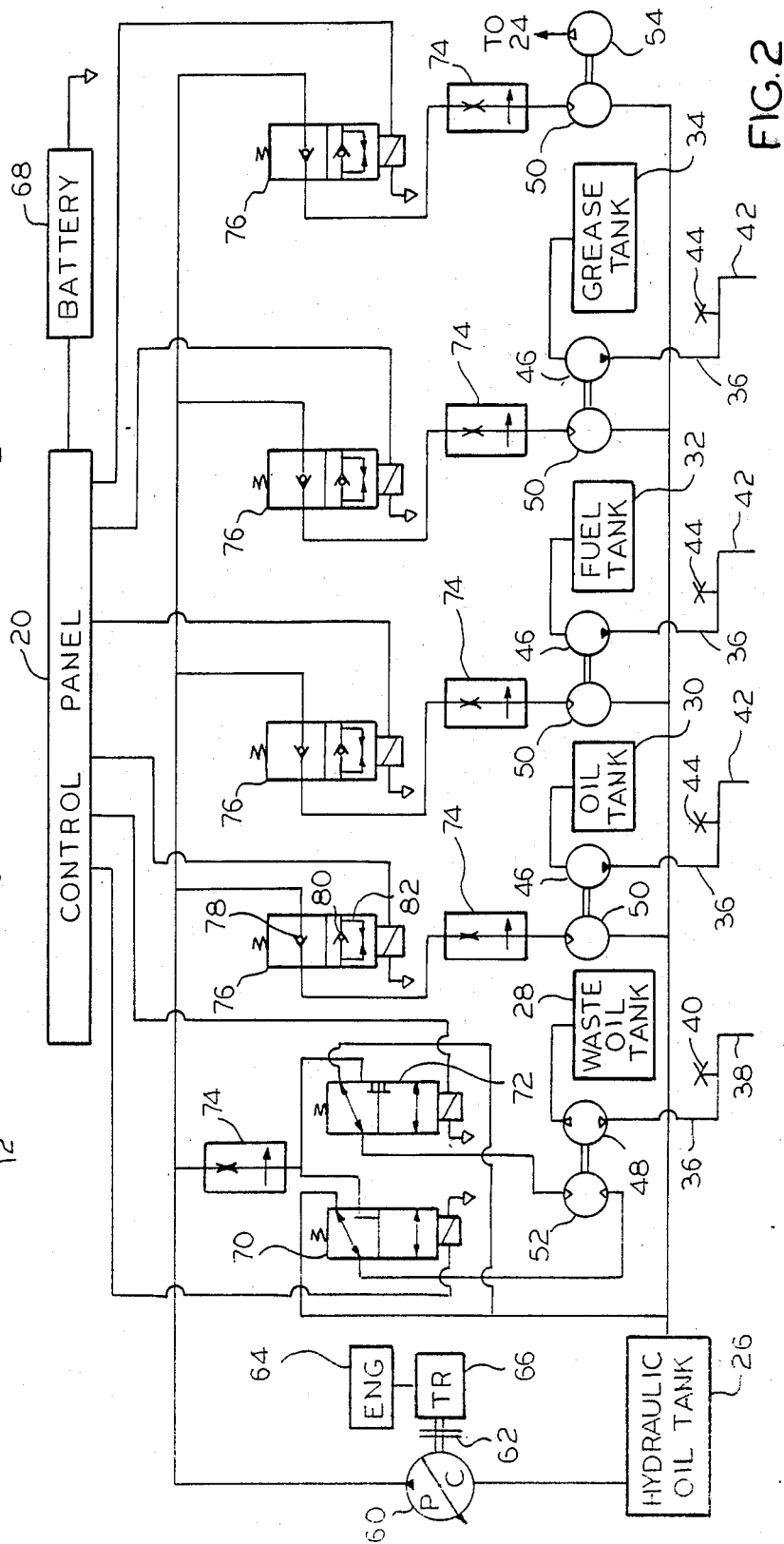
FIG. 2 is a schematic of a dispensing system forming part of the service vehicle.

An exemplary embodiment of a service vehicle in the form of a truck embodying a dispensing system made according to the invention is illustrated in FIG. 1 and is seen to include a chassis or a frame 10 mounted on ground engaging means in the form of wheels 12 for travel over the underlying terrain. The vehicle includes an operator cab 14 as well as an engine compartment 16. Servicing equipment and/or materials may be mounted appropriately on the frame in a truck bed 18 immediately to the rar of the cab 14 and a control panel 20 (FIG. 2) may be disposed on the bed 18 and coverable by an access panel or door 22.

In one embodiment of the invention, the bed 18 of the vehicle mounts a plurality of tanks or reservoirs, for example, six in number. One such tank is shown at 24 in FIG. 1 and may be utilized to receive and contain compressed air. Another such tank is shown at 26 in FIG. 2 and acts as a reservoir and as a sump for hydraulic fluid.

A third tank is shown at 28 and is identified as a "waste oil tank". The tank 28 is adapted to receive waste oil from equipment being serviced. For example, if an internal combustion engine is being serviced and such servicing includes an oil change, waste oil from the engine may be drawn into the waste oil tank in the manner to be described hereinafter.

A fourth tank is shown at 30 and is identified as a "oil tank" and may contain fresh lubricating oil. In some cases, where a variety of lubricating oils may be utilized in servicing, the oil tank 30 and associated components to be described may be multiplied in number to accommodate the number of lubricants utilized.

A fifth tank is shown at 32 and is designated a "fuel tank". Thus, the tank 32 may contain fuel such as gasoline or diesel fuel for supply to an engine during servicing. Again, where there may be a need for more than one type of fuel, the fuel tank 32 and associated components may be duplicated.

The sixth tank is shown at 34 and is identified as a "grease tank". The grease tank will be provided with heavy lubricants such as those normally characterized as greases; and again, where more than one grade of grease may be required, the number of the tanks 34 and associated components may be appropriately increased.

Associated with eachof the tanks 28, 30, 32 and 34 is a flexible hose 36, preferably on a reel 37 (FIG. 1). The hose 36 associated with the waste oil tank 28 may terminate in a probe 38 provided with a flow control valve 40 while the hoses 36 associated with the tanks 30, 32 and 34 may be provided with nozzles 42, each provided with a flow control valve. The form of each nozzle 42 will be dependent upon the material contained in the tank with which it is associated. For example, the nozzle associated with the grease tank 34 may include a typical dispenser for connection to a grease fitting while the nozzle associated with the fuel tank 32 may be one like those customarily foundin service stations.

Interposed between each hose 36 and the associated tank 30, 32, and 34 is a unidirectional, fixed displacement liquid pump 46. The pumps 46, when driven, are operable to extract liquid or fluid from the associated one of the tanks 30, 32 and 34.

A bidirectional liquid pump 48 is interposed between the hose 36 associated with the waste oil tank 28 and the waste oil tank 28. Thus, by choosing th direction of operation of the pump 48, the waste oil tank 28 may either be filled or emptied through the hose 36 as desired.

The pumps 46 are connected to be driven by associated unidirectional hydraulic motors 50. The pump 48 is connected to a bidirectional hydraulic motor 52. Thus, the bidirectional pump 48 may be driven in either direction simply by selecting appropriately the direction of operation of the hydraulic motor 52.

An additional motor 50 is connected to an air compressor 54 which is operable to provide air under pressure to the tank 24 (FIG. 1).

Hydraulic fluid under pressure for the motors 50 and 52 is provided by a pressure compensated, variable displacment hydraulic pump 60 of conventional construction. As is well known, a pressure compensated, variable displacement pump typically is provided with pistons whose stroke can be increased or decreased to respectively increase or decrease the displacement of the pump. The pressure compensation feature results in so-called "destroking" or the shortening of the piston stroke to decrease displacement in response to elevated pressure at the output of the pump whereas the lowering of the pressure at the output of the pump will result in the so-called "stroking" of the pistons to increase the length of their stroke and thereby increase the displacement of the pump.

In any event, the pump 60 is connected via a conventional power take off 62 to the engine 64 for the vehicle via the vehicle transmission 66, the engine 64 being contained in the engine compartment 16 (FIG. 1).

Electrical power for the system is taken from a battery 68.

Makeup hydraulic flud for the pump and spent hydraulic fluid from the motors 50 and 52 are respectively taken from and returned to the hydraulic oil tank 26.

Two electrically operated three-way valves 70 and 72 are connected via a conventional pressure compensated flow control 74 to the output of the variable displacement pump 60. They are also connected in the fashion indicated in FIG. 2 to the bidirectional motor 52 which is then connected back through the valve 70 and 72 to the hydraulic oil tank 26. The arrangement is such that by operation of a switch (not shown) in th control panel 20, the valve 70 may be actuated to cause the motor 52 to operated in one of its two directions and drive the pump 48 to cause waste oil in which the probe 38 may be immersed to be pumped into waste oil tank 28. When the valve 72 is actuated, the direction of operation of the motor 52 will be reversed allowing the waste oil tank 28 to be emptied.

In this fashion, waste oil may be picked up at a remote site and transported to a suitable disposal point by first filling the tank 28 at the remote site, moving the vehicle to the disposal site, and then emptying the tank 28 by reversal of the motor 52.

The pressure compensated flow control valve 74 is utilized in this circuit to control the speed of the pump 48 by controlling the speed of the bidirctional motor 52.

Each of the remaining circuit branches is basically identical one to the other insofar as control of the associated hydraulic motor 50 is concerned. Each branch includes a pressure compensated flow control valve 74 in hydraulic series with the associated motor 50 and an electrically operated control valve 76. The control valve 76 has the internal configuration illustrated which includes a first check 78 which will prevent hydraulic fluid under pressure from passing from the pump 60 to the remainder of the circuit when the associated valve 76 is deenergized but which will bleed off excess pressure in the associated leg in the direction of the outlet of the pump 60 when the latter is quiescent. Each valve 76, when energized, includes a second check 80 with a bypass orifice 82 that are in parallel with each other and are placed in series with the flow control valves 74 and the outlet of the pump 60 when the associated valve is energized. The check 80 is reversed from the check 78 with the consequence that when each valve is energized by operation of a switch (not shown) at the control panel 20, fluid under pressure from the pump 60 will be supplied to the associated motor 50.

Thus, by appropriately energizing a desired one of the valves 70 or 72, the filling or the emptying of the tank 28 can be selectively chosen. Similarly, by energizing appropate ones of the valves 76 and with additional selective operation of the nozzle valve 44 for the associated tank, liquid from the oil tank 30, the fuel tank 32 or the grease tank 34 may be dispensed. Similarly, the air compressor 54 may be energized by actuation of the valve 76 associated with its motor 50.

One important feature of the invention is not readily apparent from the drawings and is present by reason of the use of the pressure compensated, variable displacement piston pump 60. When the pump 60 is fully destroked, the engine 64 will be turning the same but will be requiried to expend no more energy than that which is necessary to overcome friction. Consequently, very little energy is expired when the pump 60 is fully destroked.

It is only necessary that the pump 60 be stroked when it is desired to either dispense a fluid from one of the tanks 30, 32 or 34, operate the air compressor 50, or utilize the waste oil system. This is due to the fact that to operate any one of such systems, hydraulic fluid under pressure must be delivered to the associated motor 50 or 52. However, even though one may wish to activate a particular system for use, particularly the waste oil system or the oil, fuel or grease systems, and ready them for operability, it may not be desirable to expend a lot of energy because the systems, while available to operate, are not in fact being actually operated. Such might be the case as, for example, when the hose 36 for the associated system is being extended from a reel to bring the nozzle 42 or probe 38 to a point of use.

In such a cae, the invention automatically assures that the pump 60 destrokes to minimize energy usage. In particular, during idle times when a system is activated but not actually being utilized, the associated valve 40 or 44 will be closed. Consequently, the pumps 46 or 48 will be pumping toward or against a closed valve 40 or 44 and their associated motors 50 and 52 will be under heavy load.

This, in turn, results in a large back pressure being created on the inlet side of the motor 50 or 52 which will be felt back at the outlet of the variable displacement pump 60. Because of its pressure compensated feature, it will begin to destroke to lower its displacement until the set or desired pressure is achieved. Thus, the pump 60 will destroke only until the flow rate necessary to maintain the activated systems in operation is required to thereby assure that no more energy expenditure is required to the engine 64 than is necessary to maintain operation of the system and overcome friction.

Thus, the invention provides a highly energy efficient system. Furthermore, the use of hydraulic components provide increased efficiency over pneumatic systems further enhancing system efficiency. Lastly, line condensation problems that lead to inoperability in certain environments are avoided in utilizing the present invention.

We claim:

1. A service truck comprising:
   a vehicle including a frame and an engine;
   a pressure compensated, variable displacement hydraulic pump mounted on said vehicle frame and drivable by said engine, said hydraulic pump being pressure compensated to provide automatic increases and decreases in pump displacement responsive to pressure at an outlet thereof;
   at least one tank on said frame for containing a fluid utilized in the servicing of equipment;
   a separate fluid pump associated with said tank(s) for pumping the fluid therein from said tank(s);
   a dispensing valve associated with each said fluid pump and operable to allow or prevent the pumping of fluid from the corresponding tank;
   a separate hydraulic motor for each said fluid pump connected thereto to drive the same; and
   an electrically operated control valve for each said motor and selectively operable to connect or disconnect the associated motor to said displacement hydraulic pump.

2. The service truck of claim 1 further including pressure compensated flow control means in hydraulic series with each said control valve and the associated motor.

3. The service truck of claim 1 further including an air compressor mounted on said frame, there being an additional one of said motors for driving said air compressor and an additional one of said control valves for said additional motor.

4. A service truck comprising:
   a vehicle including a frame and an engine;
   a pressure compensated, variable displacement hydraulic pump mounted on said vehicle frame and drivable by said engine, said hydraulic pump being pressure compensated to provide automatic increases and decreases in pump displacement responsive to pressure at an outlet thereof;
   a plurality of reservoirs on said frame, each for containing a different fluid utilized in the servicing of equipment;
   a separate fluid pump associated with each said reservoir for pumping the fluid therein from said reservoir;
   a dispensing valve associated with each said reservoir and operable to allow or prevent the pumping of fluid from the corresponding reservoir;
   a separate hydraulic motor connected to each said fluid pump to drive the same; and
   an electrically operated control valve selectively operable to connect or disconnect each motor to said variable displacement hydraulic pump and to control the selection of fluid from the corresponding one of said reservoirs.

5. The service truck of claim 4 further including a further reservoir on said frame; a bidirectional pump associated with said additional reservoir for pumping a fluid into or out of said reservoir; a bidirectional hydraulic motor connected to bidirectionally drive said bidirectional pump and adapted to receive hydraulic fluid from said hydraulic pump; and electrically operated control valve means between said hydraulic pump and said bidirectional motor for controlling energization and direction of operation thereof to thereby cause fluid to be pumped to or from said additional reservoir.

6. The service truck of claim 4 wherein there are a plurality of said fluid pumps, one for each of said reservoirs, a plurality of said hydraulic motors, one for each of said fluid pumps, and a plurality of said control valves, one for each of said motors and operable to connect the associated motor to said variable displacement hydraulic pump.

7. A service truck comprising a vehicle including a frame and an engine;
   a pressure compensated, variable displacement hydraulic pump mounted on said vehicle frame and drivable by said engine, said hydraulic pump being pressure compensated to provide automatic increases and decreases in pump displacement responsive to pressure at an outlet thereof;
   a plurality of liquid tanks on said frame, each for containing a different liquid utilized in the servicing of equipment;
   a plurality of liquid pumps, a separate one associated with each said tank for pumping the liquid therein from the associated tank;
   a dispensing valve associated with each said liquid pump and operable to allow or prevent the pumping of liquid from the corresponding tank;
   a plurality of hydraulic motors, a separate one for each said liquid pump connected thereto to drive the same; and
   a control valve for each said motor and selectively operable to connect or disconnect the associated motor to said variable displacement hydraulic pump.

8. The service truck of claim 7 further including a further tank on said frame; a bidirectional pump associated with said additional tank for pumping a fluid into or out of said tank; a bidirectional hydraulic motor connected to bidirectionally drive said bidirectional pump and adapted to receive hydraulic fluid from said hydraulic pump; and electrically operated control valve means between said hydraulic pump and said bidirectional motor for controlling energization and direction of operation thereof to thereby cause fluid to be pumped to or from said additional tank.

9. The service truck of claim 8 further including an air compressor mountd on said frame, there being an additional one of said motors for driving said air compressor and an additional one of said control valves for said additional motor.

* * * * *